United States Patent [19] Gower et al.

[11] 4,074,976

[45] Feb. 21, 1978

[54] LEVELING DEVICES FOR USE IN HIGH SPEED LIQUID SAMPLING SYSTEMS

[76] Inventors: Stephen G. M. Gower, 14 Hamilton Avenue, Pyrford, Surrey, GU22 8RS; Cyril R. Morris, 6 Millan Close, New Haw, Weybridge, Surrey, KT15 3NB; Ernest Wright, Beriswood, Sheerwater Avenue, Woodham, Weybridge, Surrey, KT15 3DS, all of England

[21] Appl. No.: 719,632

[22] Filed: Sept. 1, 1976

[51] Int. Cl.[2] ........................ B01D 21/26; B01L 3/00; B65D 23/12

[52] U.S. Cl. .......................................... 23/292; 215/6; 215/100 R; 220/DIG. 13; 233/1 R; 233/26

[58] Field of Search ................. 23/292, 259; 215/1 R, 215/6, 100 R, 227, 228, 355; 220/DIG. 13; 233/1 R, 26; 211/74 US, 76; 128/272 US, 272.3; 356/246

[56] References Cited

U.S. PATENT DOCUMENTS

| | | | |
|---|---|---|---|
| 2,288,065 | 6/1942 | Benotti | 23/292 |
| 2,652,701 | 9/1953 | Longhurst | 215/6 |
| 2,669,370 | 2/1954 | Royall, Jr. | 215/355 |
| 2,720,307 | 10/1955 | Morgan | 215/6 X |
| 3,561,630 | 2/1971 | Smedstad | 23/292 X |
| 3,603,156 | 9/1971 | Konkol | 23/292 X |
| 3,774,455 | 11/1973 | Seidler et al. | 23/259 X |
| 3,814,248 | 6/1974 | Lawhead | 210/DIG. 23 X |
| 3,898,046 | 8/1975 | Ikeda | 23/259 |
| 3,951,608 | 4/1976 | Trod | 23/259 |

FOREIGN PATENT DOCUMENTS

| | | | |
|---|---|---|---|
| 578,807 | 6/1933 | Germany | 23/292 |
| 1,195,492 | 6/1970 | United Kingdom | 23/292 |

*Primary Examiner*—Joseph Scovronek
*Attorney, Agent, or Firm*—John A. Dhuey

[57] ABSTRACT

A sample leveling device is described, for use in high speed liquid sampling systems, which comprises an insert cup capable of being removably located inside the open end of a liquid sampling tube, the cup being so shaped that, upon full or partial inversion of the tube and cup assembly from a datum position in which the open end of the tube is uppermost, the cup receives liquid held in the tube and retains the liquid when the tube is returned to its original position. The insert cup is so shaped that when it is inserted into a sampling tube its lower closed portion is offset from the line of travel a sampling probe would follow when sampling blood from the sampling tube. It is convenient to arrange the center-line of the insert cup co-axial or near co-axial with the center-line of the sampling tube into which the insert cup will be inserted.

9 Claims, 5 Drawing Figures

LEVELING DEVICES FOR USE IN HIGH SPEED LIQUID SAMPLING SYSTEMS

This invention relates to high speed liquid sampling systems. More particularly, the invention relates to a leveling device for use in high speed liquid sampling systems and specifically for use in blood sample analysis.

The development of high speed blood sample analysis machines has been restricted by the difficulty in removing samples of blood, plasma or serum from tubes with varying liquid levels. If, for example, the probe moves too far down into a serum sample it can become embedded in a blood clot if present, or it may pick up red blood corpuscles from the surface of the clot.

In previously known high speed analytical systems which sample blood from tubes the level of the sample in the tube has been determined by means of meniscus sensing probes. Alternatively the individual samples have been decanted by hand into small cuvettes. Both of these techniques are troublesome and time-consuming.

An object of the present invention is to provide a simple non-spill leveling device for use particularly in conjuncton with high speed blood sample analysis machines to maintain the serum to be sampled at a constant level within the blood sampling tube.

According to the invention a sample leveling device suitable for use in a high speed liquid sampling system includes an insert cup capable of being removably located inside the open end of a liquid sampling tube, the cup being so shaped that upon full or partial inversion of the tube and cup assembly from a datum position in which the open end of the tube is uppermost the cup receives liquid held in the tube and retains the liquid when the tube is returned to its original datum position.

In a preferred arrangement the insert cup is so shaped that when it is inserted into a sampling tube its lower closed portion is offset from the line of travel a sample probe would follow when sampling blood from the sampling tube. Normally the line of travel of the sampling probe is along the center line of the insert cup. It is convenient to arrange the center-line of the insert cup co-axial or near co-axial with the center-line of the sampling tube into which the insert cup will be inserted.

The insert cup advantageously is associated with a non-spill plug-like cap which fits into the open end of the sampling tube. The insert cup and the plug-like cap can be made as an integral unit.

The plug-like cap incorporates a funnelled passageway to facilitate entry of the sample probe and reduce substantially the chance of spilling liquid contained in the sample tube.

The material from which the insert cup is made is preferably sufficiently thin for a glass pipette or hypodermic needle to penetrate for the removal of a larger quantity of serum for further analysis should this be desired.

An embodiment of the invention will now be described by way of example only and with reference to the drawings in which.

Figure 1:
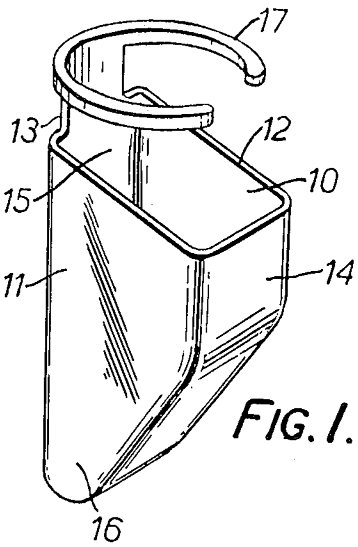
FIG. 1 shows to an enlarged scale an insert cup.
Figure 2:
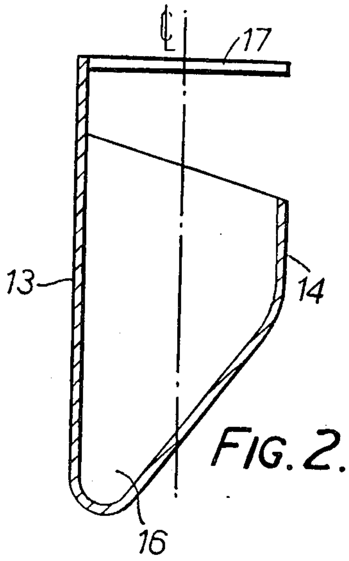
FIG. 2 shows a section through the insert cup of FIG. 1.

Referring to FIGS. 1 and 2 an insert cup 10 has parallel side walls 11 and 12, and rear wall 13 and forward wall 14. The forward wall 14, while being parallel to the rear wall 13 for a short distance from the open end 15 of cup 10, then includes downwardly towards the rear wall 13 to form a lower closed portion 16 which is offset from the center-line of cup 10.

Rear wall 13 is extended above the open end 15 of cup 10 and supports an integral top C-ring 17.

The upper free edges of side walls 11 and 12 are inclined upwardly from the top free edge of forward wall 14 towards the rear wall 13. This is to allow for easy filling of insert cup 10 when assembled inside a sampling tube as shown in FIG. 5 and when the sampling tube containing, for example blood, is inverted.

Figure 3:
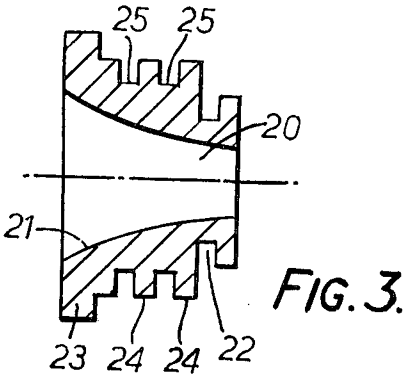
FIG. 3 shows a plug-like cap with which the insert cup of FIG. 1 is associated.
Figure 4:
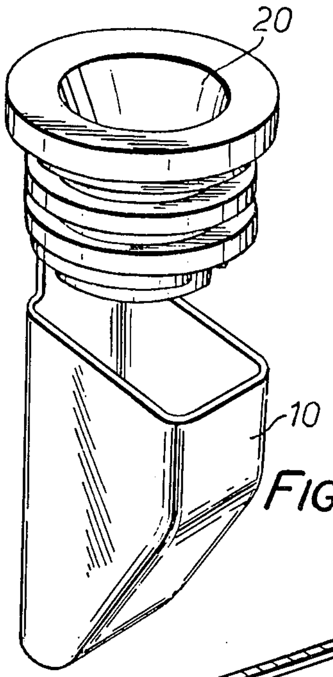
FIG. 4 shows the insert cup of FIG. 1 and the plug-like cap of FIG. 3 together as a unit.

FIG. 3 shows a plug-like cap 20 of cylindrical form and having a funnelled passageway 21 passing through it. A recessed groove 22 is located at the smaller end of cap 20 and is dimensioned to receive C-ring 17 of the insert cup 10 as is shown in FIG. 4. The large end 23 of the cap is of a diameter slightly in excess of the outside neck diameter of the sampling tube into which cap 20 fits to provide a levering lip for easy removal of cap 20 from the sampling tube. The diameter of the center portion 24 of cap 20 is consistent with the inside diameter of the sampling tube and circumferential grooves 25 are provided to offer resilience and gripping ability of cap 20 relative to the inside wall of the sampling tube.

FIG. 4 shows an assembled unit comprising an insert cup 10 and a plug-like cap 20. It will be noted how the top C-ring 17 of the insert cup 10 associtės with and is retained by the circumferential groove 22 on plug-like cap 20.

Figure 5:
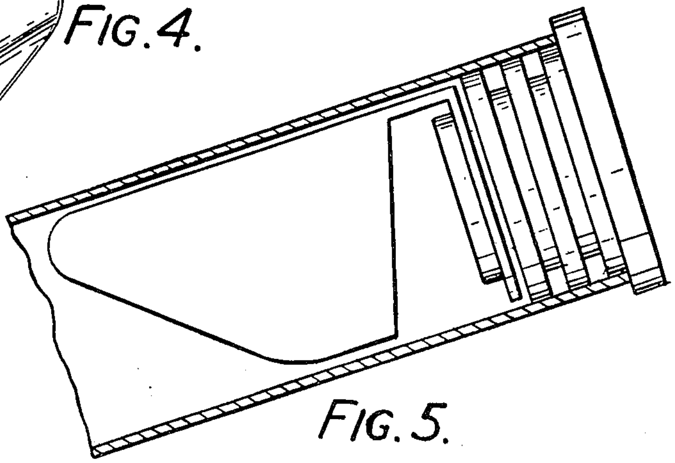
FIG. 5 shows the unit of FIG. 4 assembled inside a typical sampling tube.

FIG. 5 shows the assembled unit of FIG. 4 positioned inside the open neck of a typical sampling tube.

In use, the blood to be sampled is placed in the sampling tube which is then closed by the insert cup 10 and cap 20 assembly. The sampling tube, with the blood inside, is then inverted and upon re-erection of the sampling tube the insert cup is left substantially full of serum. The whole unit is then centrifuged at high speed to deposit the red corpuscles in the lower closed portion 16 of insert cup 10. As this lower closed portion 16 is offset from the line of the sampling probe the red corpuscles cannot be sucked into the probe. Furthermore, as the sampling probe is directed towards the angled lower surface of insert cup 10, there is no possibility of a loss or partial loss of sample due to any suction effect should the probe contact the lower surface while the sample is being taken as could be experienced if the probe were to contact a lower surface normal to its line of travel.

Accidental spillage from the sampling tube of a liquid being analyzed can be very dangerous. Blood samples, for example, can carry pathogenic bacteria or viruses. Accordingly, the shape of the plug-like cap 20 and of the passageway 21, is depenent upon the surface tension of the liquid to be analyzed and the hydrophobic or hydrophilic nature of the material from which it is made. Similarly, it will be readily appreciated that the dimensions of insert cup 10 are also dependent upon the nature of the liquid and the type of plastic used. Also, sufficiently large passageways must be provided between parallel side walls 11 and 12 and the inside surface of the sampling tube to allow for free passage into insert cup 10 of the liquid to be sampled when the sampling tube assembly is inverted. Equally important is the need to ensure that the minimum physical clearance between insert cup 10 and the inside surface of the sampling tube is such that a continuous liquid film cannot be formed between them. If such a liquid film were to be formed the liquid in cup 10 could syphon out.

In the embodiment of the invention described above, the plug-like cap 20 and the insert cup 10 preferably are made by injection molding techniques from polyvinylchloride. The following dimensions were found to be most preferred for the efficient sampling of blood:

Sampling tube — inside diameter 10.00 mm.

Insert cup 10 — maximum external dimension across parallel walls 11 and 12 — 6.00 mm and across walls 13 and 14 9.00 mm measured in a plane normal to the longitudinal axis of the sampling tube.

Plug-like cap 20 — maximum diameter of passageway 21 at its smaller end — 2.00 mm.

Insert cup 10 and plug-like cap 20, whether as an integral item or as an assembly, can conveniently be made in ribbon form for insertion into rows of sampling tubes. Further, they can be made in a variety of sizes for macro or for micro analysis.

While reference has been made in this specification to a new leveling device for use in high speed blood sample analysis, it is to be understood that the invention is equally applicable to all forms of high speed liquid sampling systems.

What is claimed is:

1. A sample leveling device for use in a liquid sampling tube having an upper, open end and a lower, closed end, comprising in combination; an insert cup having an upper, open end and a lower, closed end, said lower end being offset from the center-line of the upper, open end of the insert cup, said insert being adapted for retention in the upper portion of said sampling tube in a spaced relationship from the walls of said tube and having support means at the upper end thereof; and a plug-cap adapted to frictionally engage and locate within the upper, open end of said sampling tube, said plug-cap engaging said support means on said insert cup, whereby said insert cup is retained in the upper end of said sampling tube in a spaced relationship from the walls of said tube when said plug-cap is inserted in said tube.

2. A device as in claim 1 wherein said support means comprises a C-shaped ring attached at the upper, open end of said cup.

3. A device as in claim 1 wherein the insert cup and cap are integrally formed.

4. A device as in claim 1 wherein said cap is substantially tubular.

5. A device as in claim 4 wherein the inner diameter of said tubular cap decreases along the length of the cap from its uppermost to its lowermost end to form a funnelled passageway therein.

6. A device as in claim 2 wherein said plug-cap has a circumferential groove adjacent the bottom end thereof for operable engagement with said C-shaped ring.

7. A sampling leveling device for use in a liquid sampling tube having an open end and a closed end comprising, in combination, an insert cup having a upper, open end and a lower, closed end, said lower end being offset from the center-line of the upper, open end of the insert cup, said cup having a pair of parallel side walls, a rear wall and a forward wall, said forward wall being generally parallel to said rear wall for a short distance from the open end of said cup and inclined downwardly towards said rear wall and joined to said rear wall at the lower edge thereof, thereby forming a closed lower portion in said cup which is offset from the center-line of said cup, said rear wall having an upper edge extending above the open end of said cup; support means attached to said uper edge of said rear wall and a plug-cap adapted to engage said support means and retain said insert cup in the upper, open end of said sampling tube in a spaced relationship from the sidewalls of said tube.

8. A device as in claim 7 wherein said plug-cap is frusto-conical having a circumferential groove adjacent the lower end thereof and said support means is a C-shaped ring adapted for location within said groove.

9. A device as in claim 8 wherein said insert cup, said plug-cap and said support means are integrally formed.

* * * * *